United States Patent
Seong et al.

(10) Patent No.: US 9,062,248 B2
(45) Date of Patent: Jun. 23, 2015

(54) LIQUID CRYSTAL COMPOSITION AND LIQUID CRYSTAL DISPLAY

(71) Applicant: Samsung Display Co., Ltd., Yongin, Gyeonggi-do (KR)

(72) Inventors: Dong-Gi Seong, Seongnam-si (KR); Kyung Min Kim, Seoul (KR); Min-Jae Kim, Suwon-si (KR); Min-Hee Kim, Ansan-si (KR); Eun A Kim, Seoul (KR); Keun Chan Oh, Cheonan-si (KR); Jin Hyeong Lee, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 13/685,979

(22) Filed: Nov. 27, 2012

(65) Prior Publication Data

US 2014/0028959 A1    Jan. 30, 2014

(30) Foreign Application Priority Data

Jul. 27, 2012  (KR) .......................... 10-2012-0082538

(51) Int. Cl.
| | |
|---|---|
| *C09K 19/30* | (2006.01) |
| *C09K 19/12* | (2006.01) |
| *C09K 19/06* | (2006.01) |
| *C09K 19/52* | (2006.01) |
| *G02F 1/1337* | (2006.01) |

(52) U.S. Cl.
CPC ...... *C09K 19/3003* (2013.01); *G02F 1/133788* (2013.01); *C09K 19/3001* (2013.01); *C09K 19/3066* (2013.01); *C09K 2019/122* (2013.01); *C09K 2019/123* (2013.01); *C09K 2019/3004* (2013.01); *C09K 2019/3016* (2013.01)

(58) Field of Classification Search
CPC ..................... G02F 1/133788; C09K 19/3003; C09K 19/3001; C09K 19/3066; C09K 2019/122; C09K 2019/123; C09K 2019/3004; C09K 2019/3016
USPC ............... 252/299.01, 299.6, 299.63, 299.66; 428/1.1, 1.2; 349/167, 182
See application file for complete search history.

(56) References Cited

U.S. PATENT DOCUMENTS

| | | | |
|---|---|---|---|
| 5,965,060 A | 10/1999 | Tarumi et al. | |
| 6,066,268 A | 5/2000 | Ichinose et al. | |
| 6,174,572 B1 | 1/2001 | Hirschmann et al. | |
| 6,497,828 B1 | 12/2002 | Hirschmann et al. | |
| 7,390,539 B2 | 6/2008 | Saito et al. | |
| 7,608,199 B2 | 10/2009 | Hattori et al. | |
| 7,670,504 B2 * | 3/2010 | Kawakami et al. | 252/299.01 |
| 7,731,865 B2 | 6/2010 | Bernatz et al. | |
| 8,094,278 B2 | 1/2012 | Hanaoka et al. | |
| 8,637,125 B2 * | 1/2014 | Goto et al. | 428/1.1 |
| 8,673,411 B2 * | 3/2014 | Saito | 428/1.1 |
| 2002/0017634 A1 | 2/2002 | Heckmeier et al. | |

FOREIGN PATENT DOCUMENTS

| | | |
|---|---|---|
| JP | 2006-037054 | 2/2006 |
| JP | 2006-131906 | 5/2006 |
| JP | 2007-261954 | 10/2007 |
| KR | 1020050036393 | 4/2005 |
| KR | 1020070087601 | 8/2007 |
| KR | 101045443 | 6/2011 |
| KR | 20110113733 | 10/2011 |

* cited by examiner

*Primary Examiner* — Geraldina Visconti
(74) *Attorney, Agent, or Firm* — F. Chau & Associates, LLC

(57) ABSTRACT

A liquid crystal composition includes a first compound represented by the following Chemical Formula 1 and a second compound represented by the following Chemical Formula 2. (herein, in Chemical Formula 1, R1 is an alkenyl group including a double bond and R2 is an alkyl group or an alkoxy group, and in Chemical Formula 2, R and R' are each independently an alkyl group or an alkoxy group).

Chemical Formula 1

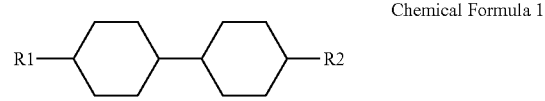

Chemical Formula 2

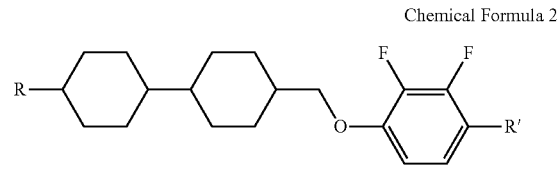

12 Claims, 10 Drawing Sheets

LIQUID CRYSTAL COMPOSITION AND LIQUID CRYSTAL DISPLAY

CROSS-REFERENCE TO RELATED APPLICATION

This application claims priority to Korean Patent Application No. 10-2012-0082538 filed on Jul. 27, 2012, the entire disclosure of which is hereby incorporated by reference herein in its entirety.

TECHNICAL FIELD

The present disclosure relates to a liquid crystal composition and a liquid crystal display.

DISCUSSION OF THE RELATED ART

A liquid crystal display element is used, for example, in watches, electronic calculators, various home appliances, measurement devices, panels for vehicles, word processors, electronic schedulers, printers, computers, televisions and the like. Representative examples of a liquid crystal display method may include, for example, a TN (twisted nematic) type, a STN (super twisted nematic) type, a DS (dynamic optical scattering) type, a GH (guest and host) type, an IPS (in-plane switching) type, an OCB (optically compensated birefringence) type, an ECB (electrically controlled birefringence) type, a VA (vertical alignment) type, a CSH (color super homeotropic) type, a FLC (ferroelectric liquid crystal) or the like. Further, multiplex driving is generally used in known static driving as a driving method, such that a simple matrix method and, currently, an active matrix (AM) method performing driving by a TFT (thin film transistor), a TED (thin film diode) or the like are mainly used.

In the display methods, the IPS type, the ECB type, the VA type, the CSH type or the like is characterized in that a liquid crystal material having negative dielectric anisotropy ($\Delta\varepsilon$) is used unlike a current general TN type or STN type. Among the display methods, particularly, the VA type liquid crystal display adopting AM driving is used in a display element requiring a wide viewing angle.

Low voltage driving, a high speed response, and a wide operation temperature range may be required in the liquid crystal material used in the VA type liquid crystal display and the like. That is, it may be required that dielectric anisotropy is negative, an absolute value is high, viscosity is low, and a nematic phase-isotropic liquid phase transition temperature Tni is high. Further, when $\Delta n \times d$ that is a multiple of refractive anisotropy ($\Delta n$) and a cell gap d is set, the refractive anisotropy of the liquid crystal material may need to be controlled within an appropriate range so as to correspond to the cell gap. In addition, the cell gap of the display element may be small to implement a high speed response, but there may be a limit in reduction of the cell gap. It may be useful that the liquid crystal composition having low viscosity is used to increase the response speed while the cell gap is not changed. In the case where the liquid crystal display is used in a television and the like, as a high speed response property is significant, there is a demand for developing a liquid crystal composition having particularly low viscosity.

SUMMARY OF THE INVENTION

Exemplary embodiments of the present invention provide a liquid crystal composition having an increased response speed and a liquid crystal display using the same.

An exemplary embodiment of the present invention provides a liquid crystal composition including a first compound represented by the following Chemical Formula 1 and a second compound represented by the following Chemical Formula 2.

Chemical Formula 1

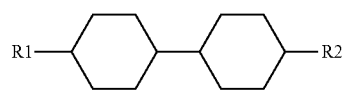

Chemical Formula 2

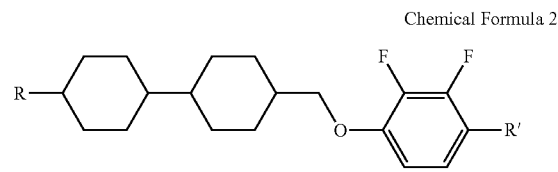

Herein, in Chemical Formula 1, R1 is an alkenyl group including a double bond and R2 is an alkyl group or an alkoxy group, and in Chemical Formula 2, R and R' are each independently an alkyl group or an alkoxy group.

The liquid crystal composition may further include at least one of a third compound represented by the following Chemical Formula 3 and a fourth compound represented by the following Chemical Formula 4.

Chemical Formula 3

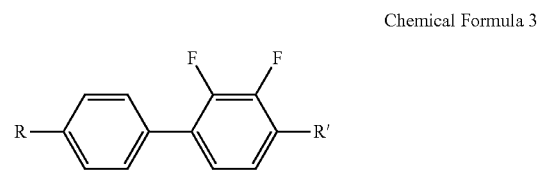

Chemical Formula 4

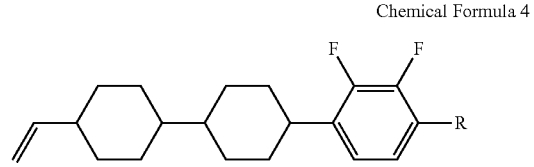

Herein, in Chemical Formulas 3 and 4, R and R are each independently an alkyl group or an alkoxy group.

The liquid crystal composition may further include a fifth compound represented by the following Chemical Formula 5, a sixth compound represented by the following Chemical Formula 6, and a seventh compound represented by the following Chemical Formula 7.

Chemical Formula 5

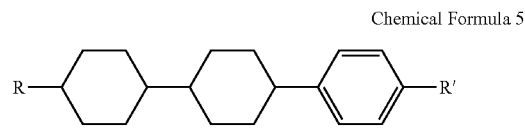

Chemical Formula 6

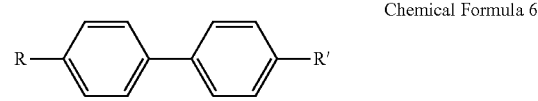

Chemical Formula 7

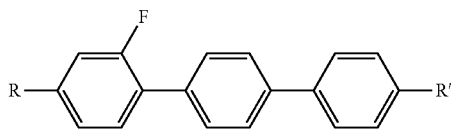

Herein, in Chemical Formulas 5 to 7, R and R' are each independently an alkyl group or an alkoxy group.

The liquid crystal composition may include the first compound, the second compound, the third compound, the fifth compound, the sixth compound, and the seventh compound, a content of the first compound may be about 19 wt % to about 39 wt %, the content of the second compound may be about 24 wt % to about 44 wt %, the content of the third compound may be about 6 wt % to about 20 wt %, the content of the fifth compound may be about 3 wt % to about 13 wt %, the content of the sixth compound may be about 5 wt % to about 15 wt %, and the content of the seventh compound may be about 1 wt % to about 11 wt %.

The liquid crystal composition may further include a sixth compound represented by the following Chemical Formula 6 and an eighth compound represented by the following Chemical Formula 8.

Chemical Formula 6

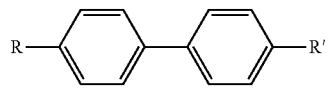

Chemical Formula 8

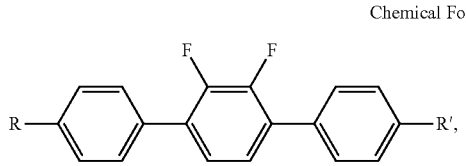

Herein, in Chemical Formulas 6 and 8, R and R' are each independently an alkyl group or an alkoxy group.

The liquid crystal composition may include the first compound, the second compound, the third compound, the fourth compound, the sixth compound, and the eighth compound, a content of the first compound may be about 19 wt % to about 59 wt %, the content of the second compound may be about 10 wt % to about 30 wt %, the content of the third compound may be about 4 wt % to about 18 wt %, the content of the fourth compound may be about 6 wt % to about 20 wt %, the content of the sixth compound may be about 3.5 wt % to about 13.5 wt %, and the content of the eighth compound may be about 3.5 wt % to about 13.5 wt %.

The liquid crystal composition may have a refractive anisotropy of about 0.080 to about 0.130.

The liquid crystal composition may have a dielectric anisotropy of about −4.0 to about −2.5.

Another exemplary embodiment of the present invention provides a liquid crystal display including: a first substrate, a second substrate facing the first substrate, a field generating electrode formed on at least one of the first substrate and the second substrate, and a liquid crystal layer including a liquid crystal molecule interposed between the first substrate and the second substrate, wherein the liquid crystal molecule includes a first compound represented by the following Chemical Formula 1, and a second compound represented by the following Chemical Formula 2.

Chemical Formula 1

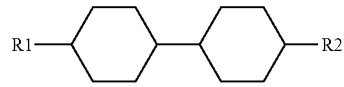

Chemical Formula 2

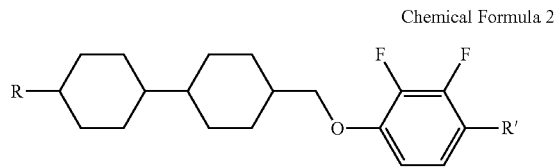

Herein, in Chemical Formula 1, R1 is an alkenyl group including a double bond and R2 is an alkyl group or an alkoxy group, and in Chemical Formula 2, R and R' are each independently an alkyl group or an alkoxy group.

The liquid crystal molecule may further include at least one of a third compound represented by the following Chemical Formula 3 and a fourth compound represented by the following Chemical Formula 4.

Chemical Formula 3

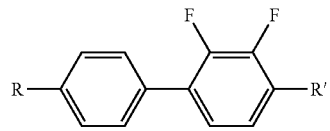

Chemical Formula 4

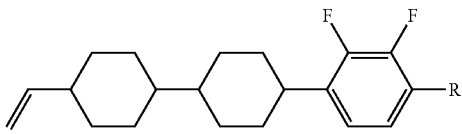

Herein, in Chemical Formulas 3 and 4, R and R' are each independently an alkyl group or an alkoxy group.

The liquid crystal molecule may further include a fifth compound represented by the following Chemical Formula 5, a sixth compound represented by the following Chemical Formula 6, and a seventh compound represented by the following Chemical Formula 7.

Chemical Formula 5

Chemical Formula 6

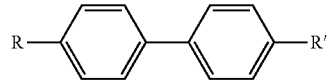

Chemical Formula 7

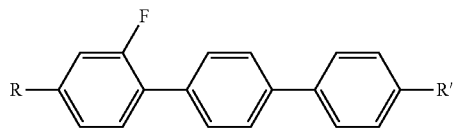

Herein, in Chemical Formulas 5 to 7, R and R' are each independently an alkyl group or an alkoxy group.

The liquid crystal molecule may further include a sixth compound represented by the following Chemical Formula 6 and an eighth compound represented by the following Chemical Formula 8.

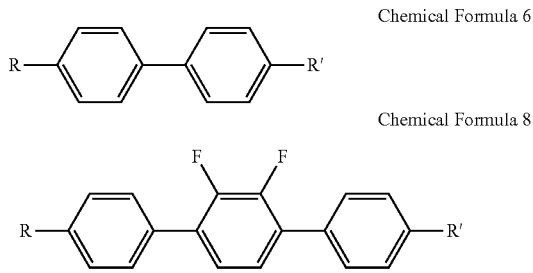

Chemical Formula 6

Chemical Formula 8

Herein, in Chemical Formulas 6 and 8, R and R' are each independently an alkyl group or an alkoxy group.

The liquid crystal composition including the liquid crystal molecule may have a refractive anisotropy of about 0.080 to about 0.130.

The liquid crystal composition including the liquid crystal molecule may have a dielectric anisotropy of about −4.0 to about −2.5.

The liquid crystal display may further include an alignment layer positioned on the field generating electrode, wherein the alignment layer may include an alignment agent and an alignment polymer, and the alignment polymer may be formed by radiating light on the alignment agent and an alignment aid.

The first substrate may be a thin film transistor substrate, the second substrate may be a common electrode substrate, and at least one of a color filter and a black matrix may be formed on the thin film transistor substrate.

The field generating electrode may include a pixel electrode positioned on the first substrate and a common electrode positioned on the second substrate, the pixel electrode may include a first cutout, the common electrode may include a second cutout, and the first cutout and the second cutout may be alternately arranged.

The liquid crystal molecule may be vertically aligned in a state where an electric field is not applied.

According to exemplary embodiments of the present invention, it is possible to increase a response speed by manufacturing a liquid crystal display by using a novel liquid crystal composition having low rotational viscosity.

BRIEF DESCRIPTION OF THE DRAWINGS

Exemplary embodiments of the present invention can be understood in more detail from the following detailed description taken in conjunction with the attached drawings in which.

DETAILED DESCRIPTION OF EXEMPLARY EMBODIMENTS

Figure 1:
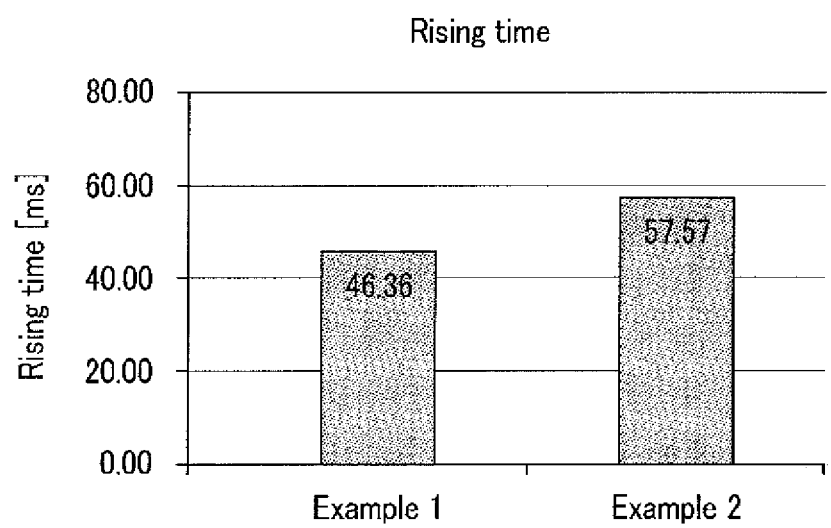
FIG. 1 is a graph obtained by measuring a rising time of a liquid crystal composition according to an exemplary embodiment of the present invention.

Hereinafter, exemplary embodiments of the present invention will be described in detail with reference to the accompanying drawings. As those skilled in the art would realize, the described embodiments may be modified in various different ways, all without departing from the spirit or scope of the present invention.

In the drawings, the thickness of layers, films, panels, regions, etc., may be exaggerated for clarity. It will be understood that when a layer is referred to as being "on" another layer or substrate, it can be directly on the other layer or substrate, or an intervening layer or layers may also be present. Like reference numerals designate like elements throughout the specification.

As used herein, the singular forms, "a", "an", and "the" are intended to include plural forms as well, unless the context clearly indicates otherwise.

For example, as shown in the following Equation 1, a cell gap should be reduced or liquid crystal properties should be increased in order to ensure high speed response of a liquid crystal display. Examples of the liquid crystal properties may include rotational viscosity and elastic coefficient.

$$T_{off}(\text{falling}) \propto \left(\frac{d}{\pi}\right)^2 \frac{Y1}{K_{eff}} \quad \text{Equation 1}$$

Equation 1 shows a factor affecting a response speed in views of a falling time $T_{off}$ that is a time required to change a white state into a black state. d represents the cell gap, $K_{eff}$ represents the elastic coefficient, and Y1 represents the rotational viscosity.

In the case where the response speed is increased by reducing the cell gap, even though a retardation of a liquid crystal layer is compensated by using liquid crystal having a high refractive index, there are difficulties in terms of quality and process, such as a reduction in yield and an increase in recognition of stains by foreign particles. Accordingly, it is beneficial that the physical properties of the liquid crystal be increased so that the rotational viscosity is reduced and the elastic coefficient is increased.

If the elastic coefficient is increased, there is an effect that the falling time is increased, but a voltage-transmittance curved line of the liquid crystal is moved to the right, thus, there may occur side effects that a threshold voltage Vth is increased and transmittance is reduced. Therefore, the liquid crystal composition in which liquid crystal components having, for example, a low molecular weight and low viscosity are mixed in a great amount needs to be designed to reduce the rotational viscosity, thus increasing the response speed.

In the present exemplary embodiment, the liquid crystal composition may be designed so that the response speed is increased by using a material having low rotational viscosity.

The liquid crystal composition according to the present exemplary embodiment of the present invention includes a first compound represented by, for example, the following Chemical Formula 1 and a second compound represented by, for example, the following Chemical Formula 2.

Chemical Formula 1

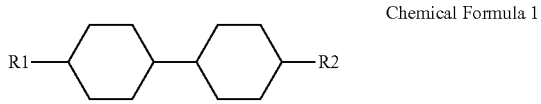

Chemical Formula 2

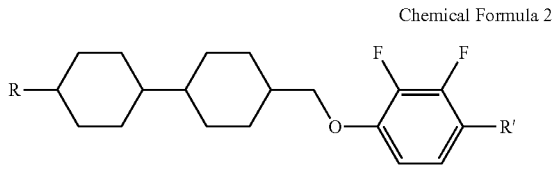

Herein, in Chemical Formula 1, R1 may be, for example, an alkenyl group having 2 to 5 carbon atoms and including a double bond, R2 may be, for example, an alkyl group or an alkoxy group, and the number of carbon atoms of the alkyl group or the alkoxy group may be, for example, 1 to 10. Further, in Chemical Formula 2, R and R' may be, for example, each independently an alkyl group or an alkoxy group, and the number of carbon atoms of the alkyl group or the alkoxy group may be, for example, 1 to 10.

The first compound may be, for example, a compound represented by the following Chemical Formula 1.1.

Chemical Formula 1.1

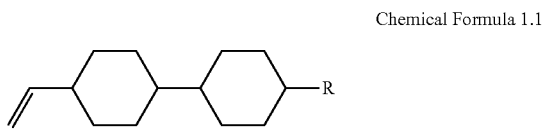

As the first compound includes the alkenyl group, there is an effect that viscosity is increased as the content thereof is increased. The second compound has negative dielectric anisotropy and increases an elastic coefficient to increase electric and optical characteristics and the response speed of liquid crystal.

The liquid crystal composition according to the present exemplary embodiment may have the refractive anisotropy of, for example, about 0.080 to about 0.130 and the dielectric anisotropy of, for example, about −4.0 to about −2.5.

The liquid crystal composition according to the present exemplary embodiment may further include, for example, at least one of a third compound represented by, for example, the following Chemical Formula 3 and a fourth compound represented by, for example, the following Chemical Formula 4.

Chemical Formula 3

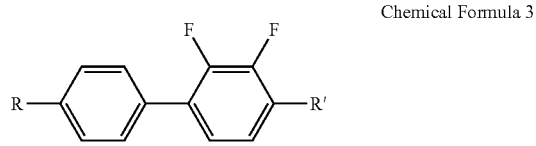

Chemical Formula 4

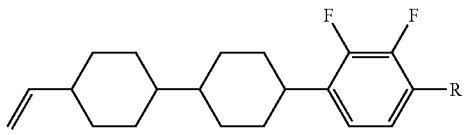

Herein, in Chemical Formulas 3 and 4, R and R' are, for example, each independently an alkyl group or an alkoxy group. The number of carbon atoms of the alkyl group or the alkoxy group may be, for example, 1 to 10.

The third compound is a liquid crystal composition that is beneficial to implementation of high polarity and low viscosity, and the fourth compound serves to ensure negative dielectric anisotropy and an additional viscosity increase effect.

The liquid crystal composition according to the present exemplary embodiment may further include a fifth compound represented by, for example, the following Chemical Formula 5, a sixth compound represented by, for example, the following Chemical Formula 6, and a seventh compound represented by, for example, the following Chemical Formula 7.

Chemical Formula 5

Chemical Formula 6

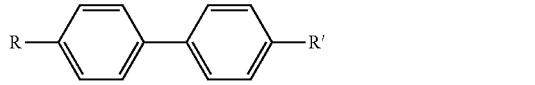

Chemical Formula 7

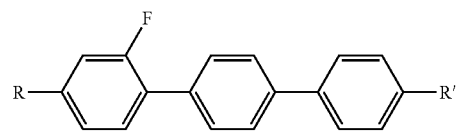

Herein, in Chemical Formulas 5 to 7, R and R' are, for example, each independently an alkyl group or an alkoxy group. The number of carbon atoms of the alkyl group or the alkoxy group may be, for example, 1 to 10.

The fifth compound to the seventh compound are liquid crystal compositions for stably maintaining a nematic liquid crystal phase and exhibiting characteristics such as refractive index, viscosity and the like.

The liquid crystal composition according to the present exemplary embodiment may further include an eighth compound represented by, for example, the following Chemical Formula 8.

Chemical Formula 8

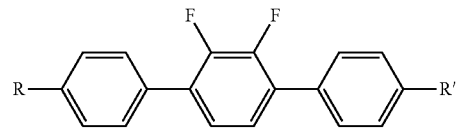

Herein, in Chemical Formula 8, R and R' are, for example, each independently an alkyl group or an alkoxy group. The number of carbon atoms of the alkyl group or the alkoxy group may be, for example, 1 to 10.

The eighth compound is a liquid crystal component that is beneficial to implementation of dielectricity and refractive anisotropy.

The liquid crystal composition according to the present exemplary embodiment of the present invention may be formed of, for example, the first compound, the second compound, the third compound, the fifth compound, the sixth compound, and the seventh compound. In this case, the content of the first compound may be, for example, about 19 wt % to about 39 wt %, the content of the second compound may be, for example, about 24 wt % to about 44 wt %, the content of the third compound may be, for example, about 6 wt % to about 20 wt %, the content of the fifth compound may be, for example, about 3 wt % to about 13 wt %, the content of the sixth compound may be, for example, about 5 wt % to about 15 wt %, and the content of the seventh compound may be, for example, about 1 wt % to about 11 wt %.

Herein, if the content of the first compound is less than about 19 wt %, a viscosity increase effect is insignificant, thus, the response speed becomes poor, and if the content of the first compound is more than about 39 wt %, reliability may deteriorate. If the content of the second compound is less than about 24 wt %, it is difficult to implement dielectric anisotropy of liquid crystal that can be normally driven at a driving voltage required by the liquid crystal display, and if the content of the second compound is more than about 44 wt %, the rotational viscosity of liquid crystal may be excessively increased to reduce the response speed. If the content of the third compound is less than about 6 wt %, it is very difficult to implement dielectric anisotropy of liquid crystal that can be normally driven at a driving voltage required by the liquid crystal display, and if the content of the third compound is more than about 20 wt %, the dielectric anisotropy, the rotational viscosity and the like of liquid crystal may be excessively increased. If the content of the fifth compound is less than about 3 wt %, the rotational viscosity of liquid crystal may be increased and phase stability of liquid crystal may be reduced, thus causing a reliability difficulty, and if the content of the fifth compound is more than about 13 wt %, it is very difficult to implement dielectric anisotropy of liquid crystal that can be normally driven at the driving voltage required by the liquid crystal display and it is difficult to implement refractive anisotropy causing appropriate transmittance. If the content of the sixth compound is less than about 5 wt %, the rotational viscosity of liquid crystal may be increased and phase stability of liquid crystal may be reduced, thus causing a reliability difficulty, and if the content of the sixth compound is more than about 15 wt %, it is very difficult to implement dielectric anisotropy of liquid crystal that can be normally driven at the driving voltage required by the liquid crystal display and it is difficult to implement refractive anisotropy causing appropriate transmittance. If the content of the seventh compound is less than about 1 wt %, the rotational viscosity of liquid crystal may be increased and phase stability of liquid crystal may be reduced, thus causing a reliability difficulty. In addition, if the content of the seventh compound is more than about 11 wt %, it is very difficult to implement dielectric anisotropy of liquid crystal that can be normally driven at the driving voltage required by the liquid crystal display and it is difficult to implement refractive anisotropy causing appropriate transmittance.

The liquid crystal composition according to the exemplary embodiment of the present invention may be formed of, for example, the first compound, the second compound, the third compound, the fourth compound, the sixth compound, and the eighth compound. In this case, the content of the first compound may be, for example, about 19 wt % to about 59 wt %, the content of the second compound may be, for example, about 10 wt % to about 30 wt %, the content of the third compound may be, for example, about 4 wt % to about 18 wt %, the content of the fourth compound may be, for example, about 6 wt % to about 20 wt %, the content of the sixth compound may be, for example, about 3.5 wt % to about 13.5 wt %, and the content of the eighth compound may be, for example, about 3.5 wt % to about 13.5 wt %.

Herein, if the content of the first compound is less than about 19 wt %, a viscosity increase effect is insignificant, thus, the response speed becomes poor, and if the content of the first compound is more than about 59 wt %, reliability may deteriorate. If the content of the second compound is less than about 10 wt %, it is difficult to implement dielectric anisotropy of liquid crystal that can be normally driven at the driving voltage required by the liquid crystal display, and if the content of the second compound is more than about 30 wt %, the rotational viscosity of liquid crystal may be excessively increased to reduce the response speed. If the content of the third compound is less than about 4 wt %, it is very difficult to implement dielectric anisotropy of liquid crystal that can be normally driven at the driving voltage required by the liquid crystal display, and if the content of the third compound is more than about 18 wt %, the dielectric anisotropy, the rotational viscosity and the like of liquid crystal may be excessively increased. If the content of the fourth compound is less than about 6 wt %, a viscosity increase effect is insignificant, thus, the response speed becomes poor, and if the content of the fourth compound is more than about 20 wt %, reliability may deteriorate. If the content of the sixth compound is less than about 3.5 wt %, the rotational viscosity of liquid crystal may be increased and phase stability of liquid crystal may be reduced, thus causing a reliability difficulty, and if the content of the sixth compound is more than about 13.5 wt %, it is very difficult to implement dielectric anisotropy of liquid crystal that can be normally driven at the driving voltage required by the liquid crystal display and it is difficult to implement refractive anisotropy causing appropriate transmittance. If the content of the eighth compound is less than about 3.5 wt %, it is difficult to implement dielectric anisotropy and refractive anisotropy of liquid crystal that can be normally driven at the driving voltage required by the liquid crystal display, and if the content of the eighth compound is more than about 13.5 wt %, there is a difficultly in that the dielectric anisotropy, the rotational viscosity and the like of liquid crystal are excessively increased.

Figure 2:
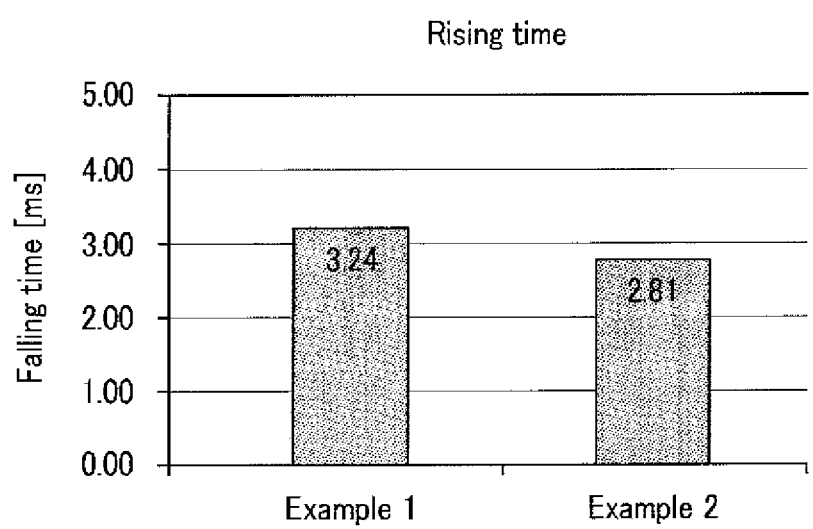
FIG. 2 is a graph obtained by measuring a falling time of the liquid crystal composition according to an exemplary embodiment of the present invention.

FIG. 1 is a graph obtained by measuring a rising time of a liquid crystal composition according to an exemplary embodiment of the present invention. FIG. 2 is a graph obtained by measuring a falling time of the liquid crystal composition according to an exemplary embodiment of the present invention.

In FIGS. 1 and 2, after a test liquid crystal panel including the liquid crystal layer formed by using the aforementioned liquid crystal composition according to the present exemplary embodiment of the present invention was manufactured, a rising time and a falling time were measured.

Example 1 is a case where the aforementioned first compound is included in the content of about 29 wt % based on the entire liquid crystal composition, the second compound is included in the content of about 34 wt % based on the entire liquid crystal composition, the third compound is included in the content of about 13 wt % based on the entire liquid crystal composition, the fifth compound is included in the content of about 8 wt % based on the entire liquid crystal composition, the sixth compound is included in the content of about 10 wt % based on the entire liquid crystal composition, and the seventh compound is included in the content of about 6 wt % based on the entire liquid crystal composition.

Example 2 is a case where the aforementioned first compound is included in the content of about 39 wt % based on the entire liquid crystal composition, the second compound is included in the content of about 20 wt % based on the entire liquid crystal composition, the third compound is included in the content of about 11 wt % based on the entire liquid crystal composition, the fourth compound is included in the content of about 13 wt % based on the entire liquid crystal composition, the sixth compound is included in the content of about 8.5 wt % based on the entire liquid crystal composition, and the eighth compound is included in the content of about 8.5 wt % based on the entire liquid crystal composition.

Referring to FIGS. 1 and 2, in Example 1, the rising time is about 46.36 ms and the falling time is about 3.24 ins, and in Example 2, the rising time is about 57.57 ins and the falling time is about 2.81 Ins. These numerical values are generally lower than those in the case where another known liquid crystal composition is used, thus, it can be seen that there is a response speed increase effect.

Figure 3:
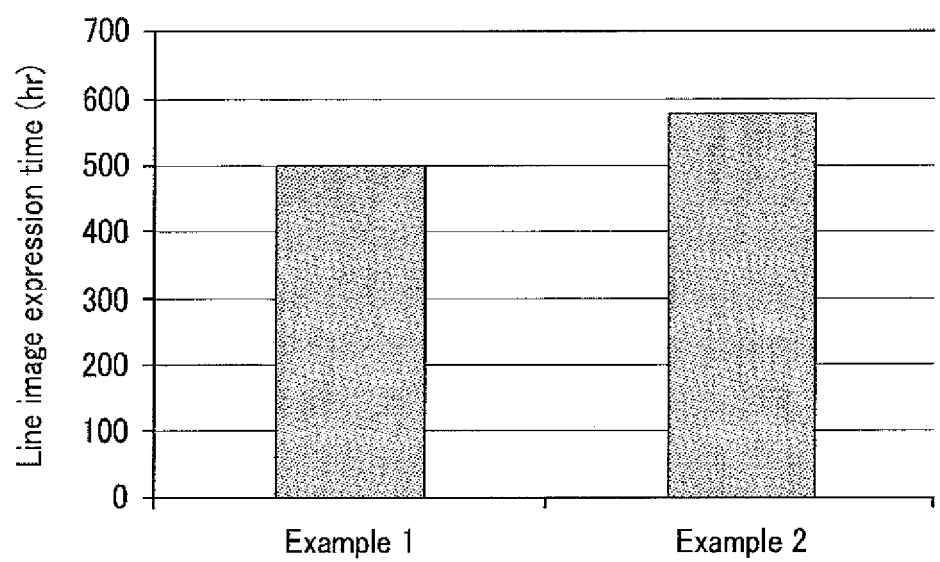
FIG. 3 is a graph obtained by evaluating a line image sticking of the liquid crystal composition according to an exemplary embodiment of the present invention.

FIG. 3 is a graph obtained by evaluating a line image sticking of the liquid crystal composition according to an exemplary embodiment of the present invention.

Referring to FIG. 3, a line image sticking expression time of Example 1 was about 500 hours and the line image sticking expression time of Example 2 was about 580 hours. When a reliability evaluation standard of the liquid crystal display is set to be about 336 hours, the line image sticking expression times of Examples 1 and 2 based on the reliability evaluation standard satisfy the reliability standard.

Figure 4:
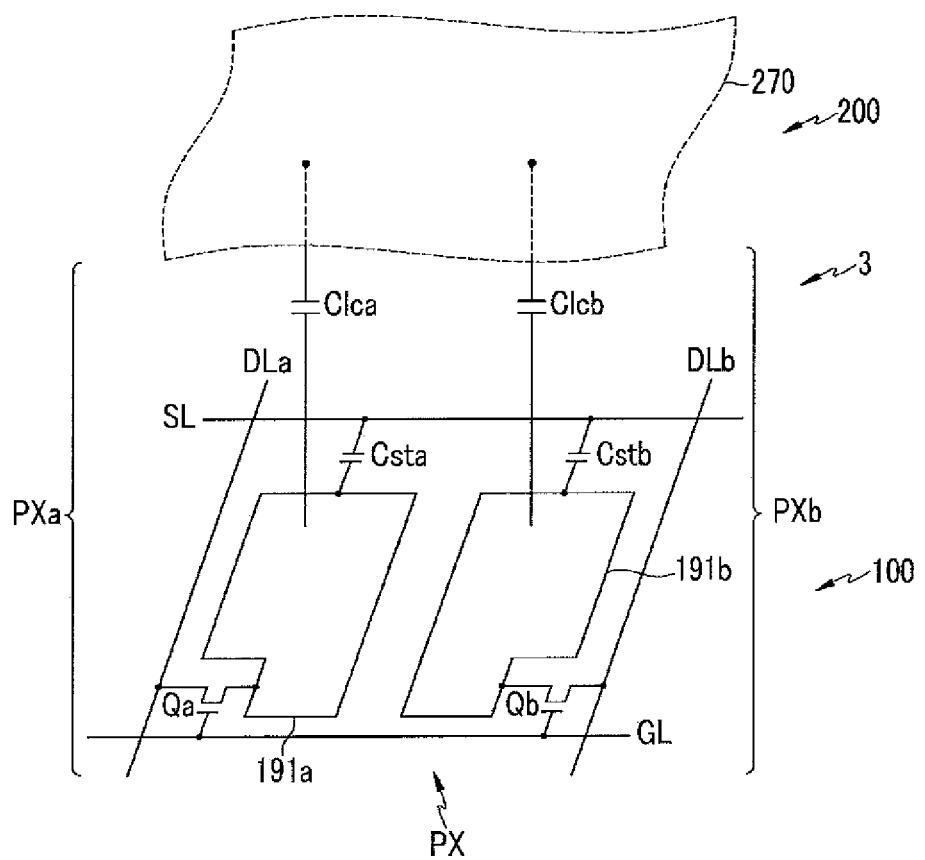
FIG. 4 is an equivalent circuit diagram for a pixel of a liquid crystal display according to an exemplary embodiment of the present invention.

FIG. 4 is an equivalent circuit diagram for a pixel of a liquid crystal display according to an exemplary embodiment of the present invention.

Referring to FIG. 4, the liquid crystal display according to the present exemplary embodiment of the present invention includes, for example, a thin film transistor array panel 100 and a common electrode panel 200 that face each other, and a liquid crystal layer 3 interposed therebetween.

The liquid crystal display includes signal lines including, for example, a plurality of gate lines GL, a plurality pairs of data lines DLa and DLb, and a plurality of storage electrode lines SL, and a plurality of pixels PX connected thereto.

Each pixel PX includes, for example, a pair of subpixels PXa and PXb, and the subpixels PXa and PXb include switching elements Qa and Qb, liquid crystal capacitors Clca and Clcb, and storage capacitors Csta and Cstb.

The switching elements Qa and Qb are, for example, a three terminal element such as a thin film transistor provided in a lower display panel 100, a control terminal thereof is connected to the gate lines GL, an input terminal is connected to the data lines DLa and DLb, and an output terminal is connected to the liquid crystal capacitors Clca and Clcb and the storage capacitors Csta and Cstb.

The liquid crystal capacitors Clca and Clcb have, for example, subpixel electrodes 191a and 191b and a common electrode 270 as two terminals, and a liquid crystal layer 3 portion between the two terminals is formed of a dielectric material.

The storage capacitors Csta and Cstb acting as an auxiliary capacitor of the liquid crystal capacitors Clca and Clcb are formed by, for example, overlapping the storage electrode line SL provided on the lower display panel 100 and the subpixel electrodes 191a and 191b with an insulator interposed therebetween, and a predetermined voltage such as a common voltage Vcom is applied to the storage electrode line SL.

Voltages charged in two liquid crystal capacitors Clca and Clcb are set, for example, to be slightly different from each other. For example, the data voltage applied to the liquid crystal capacitor Clca is set to be always lower or higher than the data voltage applied to the other liquid crystal capacitor Clcb adjacent thereto. If the voltages of the two liquid crystal capacitors Clca and Clcb are appropriately controlled, an image seen from a lateral surface can closely approach an image seen from a front surface, thus, lateral surface visibility of the liquid crystal display is increased.

Figure 5:
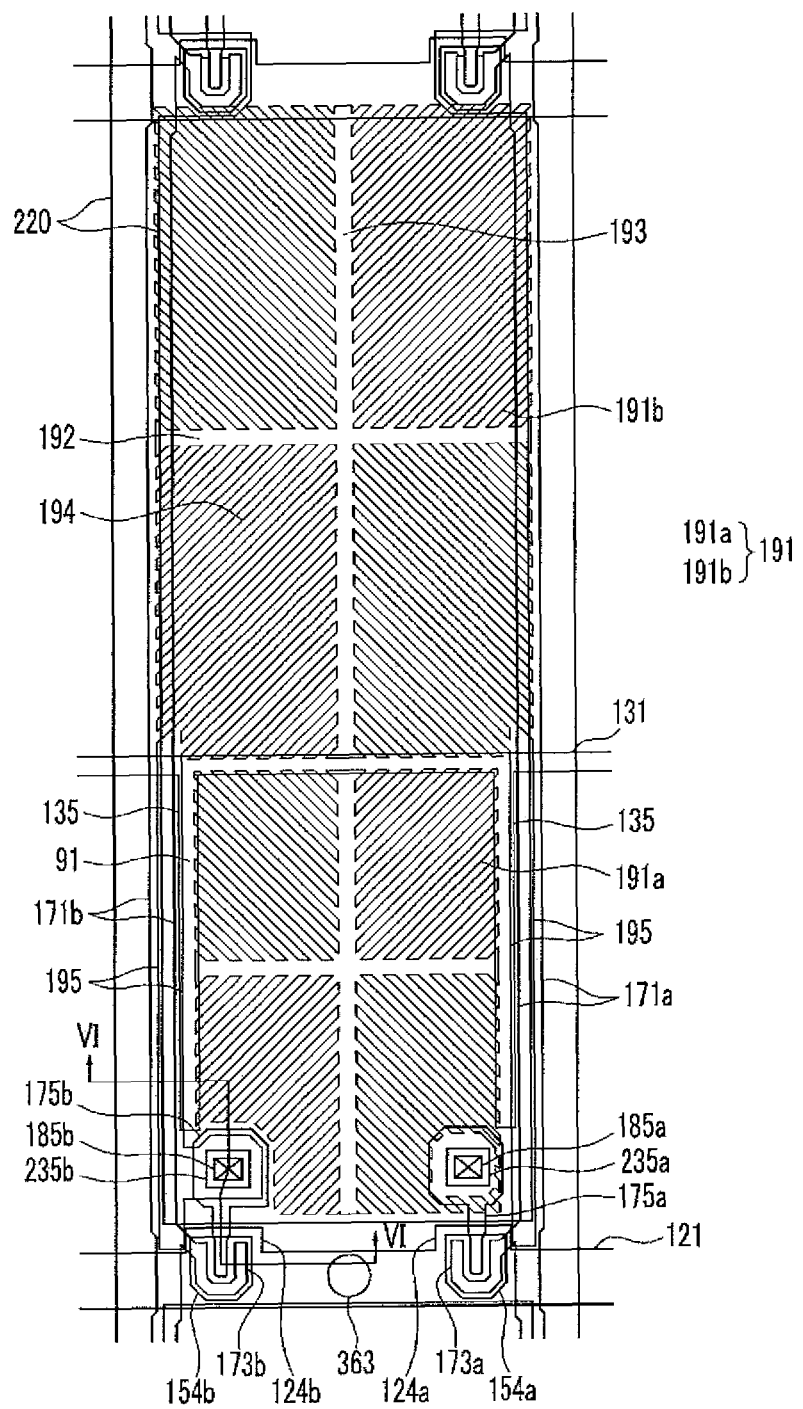
FIG. 5 is a layout view of the liquid crystal display according to an exemplary embodiment of the present invention.
Figure 6:
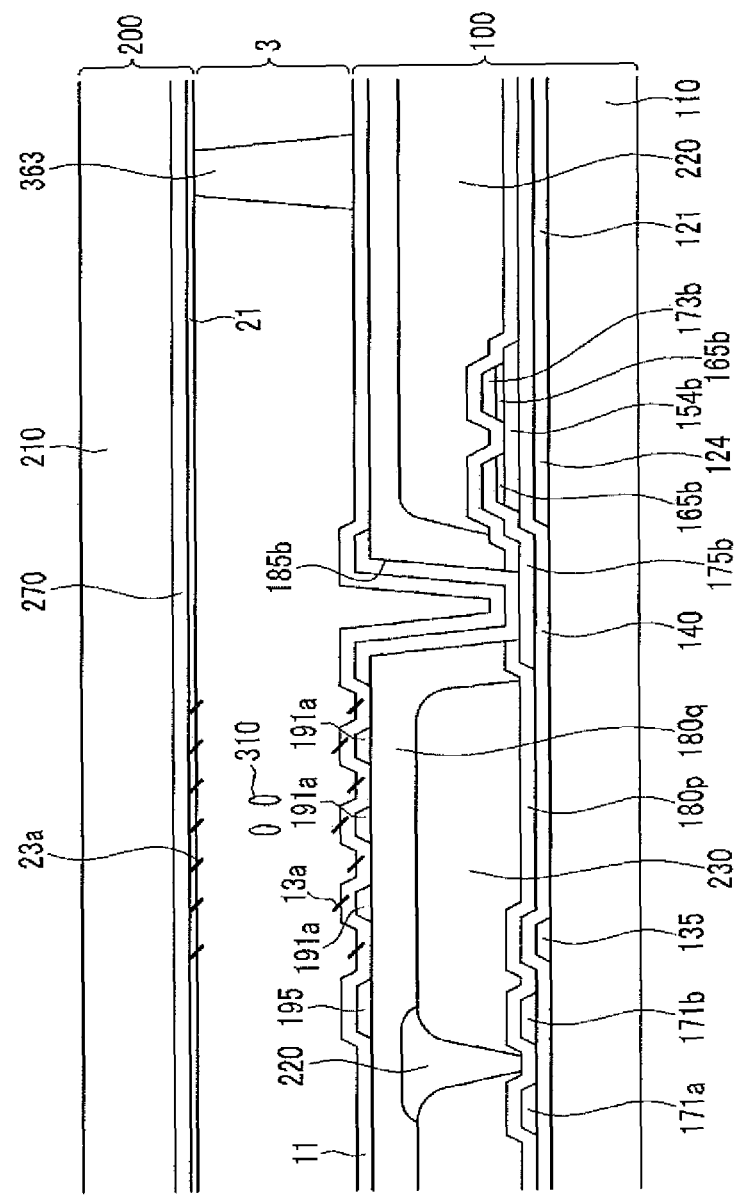
FIG. 6 is a cross-sectional view taken along line VI-VI of FIG. 5.

FIG. 5 is a layout view of the liquid crystal display according to an exemplary embodiment of the present invention, and FIG. 6 is a cross-sectional view taken along line VI-VI of FIG. 5.

Referring to FIG. 5 and FIG. 6, the liquid crystal display according to the present exemplary embodiment of the present invention includes, for example, a lower display panel 100 and an upper display panel 200 that face each other, and a liquid crystal layer 3 interposed between the two display panels 100 and 200.

First, the lower display panel 100 will be described.

A plurality of gate lines 121 and a plurality of storage electrode lines 131 and 135 are formed on an insulating substrate 110. For example, the insulating substrate 110, can be made of, for example, transparent glass, quartz or plastic. Further, in an exemplary embodiment, the glass may include, for example, tempered glass. In an exemplary embodiment, the insulating substrate 110 may be formed of, for example, one of polycarbonate (PC), polyester (PET), polypropylene (PP), polyethylene (PE) and polymethyl methacrylate (PMMA).

The gate lines 121 transfer a gate signal and mainly extend in, for example, a horizontal direction. Each gate line 121 includes, for example, a plurality of first and second gate electrodes 124a and 124b protruding upward.

The storage electrode lines include, for example, stem lines 131 extending in substantially parallel to the gate lines 121 and a plurality of storage electrodes 135 extending therefrom. The shape and disposal of the storage electrode lines 131 and 135 may be changed into various forms.

The gate lines 121 and the storage electrode lines 131 and 135 may be formed of at least one selected from the group consisting of, for example, aluminum-based metal such as aluminum (Al) and an aluminum alloy, silver-based metal such as silver (Ag) and a silver alloy, and copper-based metal such as copper (Cu) and a copper alloy.

The present exemplary embodiment describes that the gate lines 121 and the gate electrodes 124a and 124b are formed of, for example, a single layer, but exemplary embodiments of the present invention are not limited thereto. Alternatively, for example, the gate lines 121 and the gate electrodes 124a and 124b may be formed in a dual layer or triple layer form.

In the case where the gate lines and the gate electrodes have a dual-layer structure, the gate lines 121 and the gate electrodes 124a and 124b may be formed of, for example, a lower layer and an upper layer, and the lower layer may be formed of, for example, at least one selected from the group consisting of molybdenum-based metal such as molybdenum (Mo) and a molybdenum alloy, chromium (Cr), a chromium alloy, titanium (Ti), a titanium alloy, tantalum (Ta), a tantalum alloy, manganese (Mn), and a manganese alloy. The upper layer may be formed of, for example, at least one selected from the group consisting of aluminum-based metal such as aluminum (Al) and an aluminum alloy, silver-based metal such as silver (Ag) and a silver alloy, and copper-based metal such as copper (Cu) and a copper alloy. In the case of the triple layer structure, the gate lines 121 and the gate electrodes 124a and 124b may be formed of, for example, a combination of layers having different physical properties.

The gate insulating layer 140 is formed on the gate lines 121 and the storage electrode lines 131 and 135, and a plurality of semiconductors 154a and 154b made of amorphous or crystalline silicon and the like are formed on the gate insulating layer 140. The gate insulating layer 140 may be made of, for example, silicon oxide (SiOx) or silicon nitride (SiNx).

A plurality pairs of ohmic contacts 163b and 165b are formed on the semiconductors 154a and 154b, and the ohmic contacts 163b and 165b may be made of, for example, a material such as n+ hydrogenated amorphous silicon in which silicide or n-type impurity is doped at a high concentration.

A plurality pairs of data lines 171a and 171b and a plurality pairs of first and second drain electrodes 175a and 175b are formed on the ohmic contacts 163b and 165b and the gate insulating layer 140.

The data lines 171a and 171b transfer a data signal and mainly extend, for example, in a vertical direction to cross the stem lines 131 of the gate line 121 and the storage electrode line. For example, the data lines 171a and 171b extend toward the first and the second gate electrodes 124a and 124b and include first and second source electrodes 173a and 173b bent in a U-shape, and the first and the second source electrodes 173a and 173b face the first and the second drain electrodes 175a and 175b with the first and the second gate electrodes 124a and 124b interposed therebetween.

The data lines 171a and 171b may be formed of, for example, at least one selected from the group consisting of aluminum-based metal such as aluminum (Al) and an aluminum alloy, silver-based metal such as silver (Ag) and a silver alloy, and copper-based metal such as copper (Cu) and a copper alloy. The present exemplary embodiment describes that the data lines 171a and 171b are formed of a single layer, but exemplary embodiments are not limited thereto. Alternatively, for example, the data lines 171a and 171b may be formed in a dual layer or triple layer form.

Each of the first and the second drain electrodes 175a and 175b extends, for example, upward from an end thereof, which is partially surrounded by the first and the second source electrodes 173a and 173b, and the other end thereof may have a wide area for connection to another layer.

However, the shape and disposal of the first and the second drain electrodes 175a and 175b and the data lines 171a and 171b may be variously changed.

The first and the second gate electrodes 124a and 124b, the first and the second source electrodes 173a and 173b, and the first and the second drain electrodes 175a and 175b form first and second thin film transistors Qa and Qb together with the first and the second semiconductors 154a and 154b, and channels of the first and the second thin film transistors Qa and Qb are formed in the first and the second semiconductors 154a and 154b between the first and the second source electrodes 173a and 173b and the first and the second drain electrodes 175a and 175b.

The ohmic contacts 163b and 165b exist only between the semiconductors 154a and 154b therebeneath and the data lines 171a and 171b and the drain electrodes 175a and 175b thereon, and reduce contact resistance therebetween. In the semiconductors 154a and 154b, an exposed portion that is not covered with the data lines 171a and 171b and the drain electrodes 175a and 175b exists between the source electrodes 173a and 173b and the drain electrodes 175a and 175b.

The lower passivation layer 180p made of, for example, silicon nitride or silicon oxide is formed on the data lines 171a and 171b, the drain electrodes 175a and 175b and the exposed portions of the semiconductors 154a and 154b.

A color filter 230 is formed on the lower passivation layer 180p. The color filter 230 may include, for example, a color filter having three colors of red, green, and blue. For example, a single layer or a dual layer of chromium and chromium oxide, or a light blocking member 220 made of an organic material is formed on the color filter 230. The light blocking member 220 may have openings arranged in a matrix form.

An upper passivation layer 180q formed of, for example, a transparent organic insulating material is formed on the color filter 230 and the light blocking member 220. The upper passivation layer 180q prevents the color filter 230 from being exposed and provides a flat surface. For example, the upper passivation layer 180q may be formed of benzocyclobutene (BCB) or acrylic resin. A plurality of contact holes 185a and 185b through which the first and the second drain electrodes 175a and 175b are exposed are formed on the passivation layer 180q.

A plurality of pixel electrodes 191 are formed on the upper passivation layer 180q. The pixel electrode 191 may be made of, for example, a transparent conductive material such as indium tin oxide (ITO), indium-tin-zinc-oxide (ITZO), aluminium zinc oxide (AZO), zinc oxide (ZnO) or indium zinc oxide (IZO), or reflective metal such as, for example, aluminum, silver, chromium or an alloy thereof.

Each pixel electrode 191 includes, for example, the first and the second subpixel electrodes 191a and 191b separated from each other, and the first and the second subpixel electrodes 191a and 191b each include, for example, a cross type stem portion formed of a horizontal stem portion 192 and a vertical stem portion 193 crossing the horizontal stem portion, and fine branch portions 194 inclinedly extending from the horizontal stem portion 192 and the vertical stem portion 193. Two connection electrodes 195 is extended from the second subpixel electrode 191b and formed along the data line 171. One of the connection electrodes 195 is connected to the drain electrode 175b through the contact hole 185b.

Next, the upper display panel 200 will be described.

A common electrode 270 is formed on an entire surface of the transparent insulating substrate 210 in the upper display panel 200. The common electrode 270 is made of, for example, a transparent conductor such as ITO indium-tin-zinc-oxide (ITZO), aluminium zinc oxide (AZO), zinc oxide (ZnO) or indium zinc oxide (IZO).

A spacer 363 is formed to maintain a space between the upper display panel 200 and the lower display panel 100.

Alignment layers 11 and 21 are each applied on internal surfaces of the lower display panel 100 and the upper display panel 200, and may be, for example, a vertical alignment layer. The alignment layers 11 and 21 may be formed by, for example, including at least one of generally-used materials as the liquid crystal alignment layer such as polyamic acid or polyimide. The alignment layers 11 and 21 include, for example, alignment polymers 13a and 23a formed by radiating light on an alignment aid. The alignment polymer is called, for example, reactive mesogen.

A polarizer (not shown) may be provided on external surfaces of the lower display panel 100 and the upper display panel 200.

A liquid crystal layer 3 is interposed between the lower display panel 100 and the upper display panel 200. The liquid crystal layer 3 includes a plurality of liquid crystal molecules 310.

The liquid crystal 310 has, for example, negative dielectric anisotropy, and is aligned so that a long axis thereof is almost vertical to surfaces of the two display panels 100 and 200 in a state where there is no electric field. In the present exemplary embodiment, the liquid crystal layer 3 includes the liquid crystal molecules 310 formed of the aforementioned liquid crystal composition according to an exemplary embodiment of the present invention. Specifically, in the present exemplary embodiment, the liquid crystal layer 3 includes the liquid crystal molecules 310 including a first compound represented by, for example, the following Chemical Formula 1 and a second compound represented by, for example, the following Chemical Formula 2.

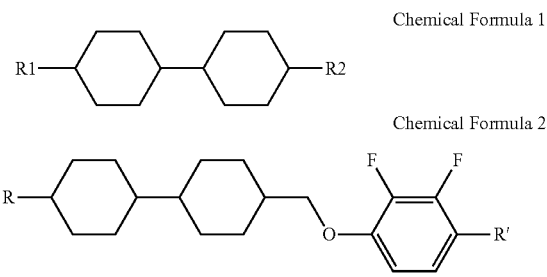

Chemical Formula 1

Chemical Formula 2

Herein, in Chemical Formula 1, R1 may be, for example, an alkenyl group having 2 to 5 carbon atoms and including a double bond, R2 may be, for example, an alkyl group or an alkoxy group, and the number of carbon atoms of the alkyl group or the alkoxy group may be, for example, 1 to 10. In addition, in Chemical Formula 2, R and R' are, for example, each independently an alkyl group or an alkoxy group. The number of carbon atoms of the alkyl group or the alkoxy group may be, for example, 1 to 10.

The first compound may be a compound represented by, for example, the following Chemical Formula 1.1.

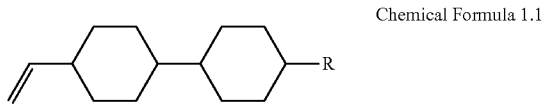

Chemical Formula 1.1

The description of the liquid crystal composition according to the present exemplary embodiment of the present invention may be applied to the liquid crystal composition included in the liquid crystal layer 3 of the liquid crystal display according to the present exemplary embodiment.

If the voltage is applied to the pixel electrode 191 and the common electrode 270, the liquid crystal molecules 310 respond the electric field formed between the pixel electrode 191 and the common electrode 270, such that a direction of the long axis thereof is changed into a direction that is vertical to a direction of the electric field. The degree of change in polarization of incident light to the liquid crystal layer 3 varies according to the degree of inclination of the liquid crystal 310, the change in polarization is shown by a change in transmittance by a polarizer, and the liquid crystal display displays an image therethrough.

The direction where the liquid crystal molecules 310 are inclined is determined by, for example, the fine branch 194 of the pixel electrode 191, and the liquid crystal 310 is, for example, inclined in a direction that is parallel to a length direction of the fine branch 194. As one pixel electrode 191 includes, for example, four subregions where length directions of the fine branch 194 are different from each other, the directions where the liquid crystal molecules 310 are inclined are approximately four directions, and four domains where alignment directions of the liquid crystal molecules 310 are different from each other are formed in the liquid crystal layer 3. As described above, a viewing angle of the liquid crystal display may be increased by diversifying the inclination direction of liquid crystal.

The liquid crystal display according to the present exemplary embodiment may have a largely increased response speed by controlling a pre-tilt that is an initial alignment direction of the liquid crystal molecules 310 by the alignment polymers 13a and 23a formed by polymerization of the alignment aid through a design of the liquid crystal composition having low rotational viscosity.

Figure 7:
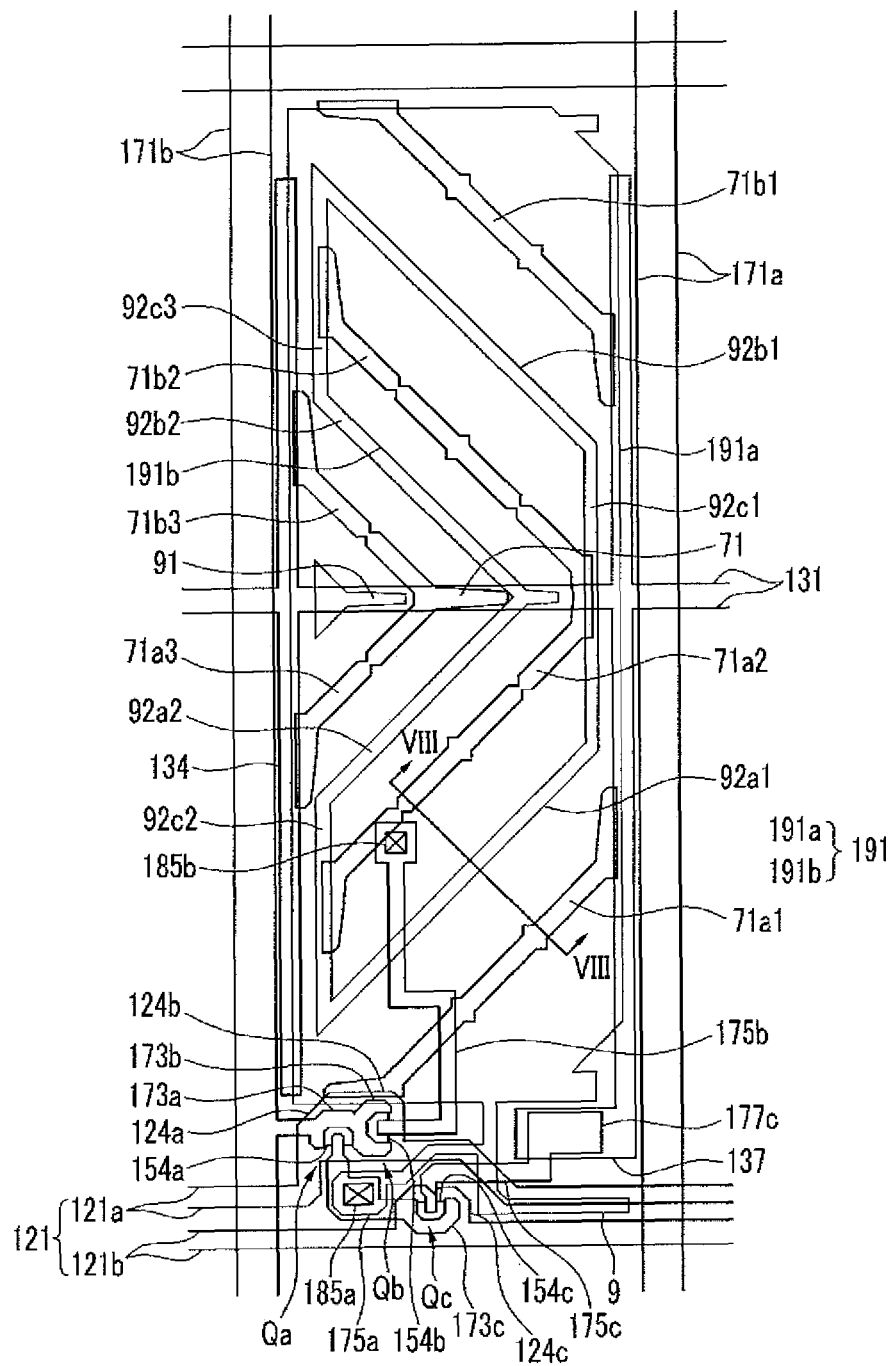
FIG. 7 is a layout view of the liquid crystal display according to an exemplary embodiment of the present invention.
Figure 8:
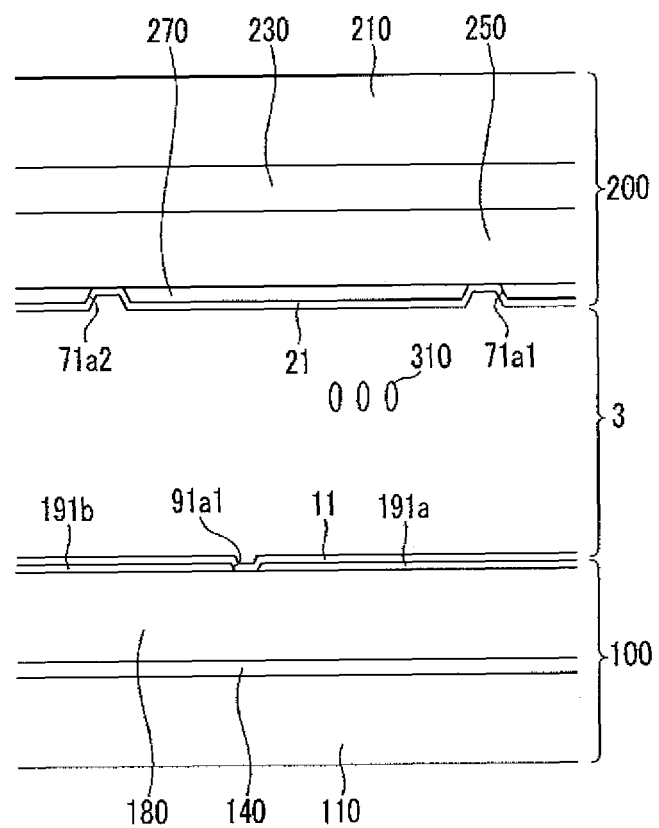
FIG. 8 is a cross-sectional view taken along line of FIG. 7.

FIG. 7 is a layout view of the liquid crystal display according to an exemplary embodiment of the present invention, and FIG. 8 is a cross-sectional view taken along line of FIG. 7.

First, the lower display panel 100 will be described.

A plurality of gate lines 121 including, for example, the first gate line 121a and the second gate line 121b and a plurality of storage electrode lines 131 are formed on the insulating substrate 110.

The first gate line 121a and the second gate line 121b mainly extend, for example, in a horizontal direction and a gate signal is transferred therethrough. The first gate line 121a includes, for example, the first gate electrode 124a and the second gate electrode 124b protruding upward, and the second gate line 121b includes, for example, a third gate electrode 124c. For example, the first gate electrode 124a and the second gate electrode 124b are connected to each other to form one protrusion portion.

The storage electrode line 131 mainly extends, for example, in a horizontal direction and a predetermined voltage such as a common voltage Vcom is transferred therethrough. The storage electrode line 131 includes, for example, a pair of vertical portions 134 extending to be approximately vertical to the gate line 121 and a capacitive electrode 137 extending to protrude from the vertical portions 134.

The gate insulating layer 140 is formed on the gate lines 121 and the storage electrode lines 131, and a plurality of semiconductor stripes (not shown) that may be made of, for example, amorphous or crystalline silicon and the like are formed on the gate insulating layer 140. The gate insulating layer 140 may be made of, for example, silicon oxide (SiOx) or silicon nitride (SiNx).

The semiconductor stripe mainly extends, for example, in a vertical direction, and includes first and second semiconductors 154a and 154b extending toward the first and the second gate electrodes 124a and 124b and connected to each other, and a third semiconductor 154c positioned on the third gate electrode 124c.

A plurality pair of ohmic contacts (not shown) are formed on the semiconductors 154a, 154b, and 154c. The ohmic contacts may be made of, for example, a material such as n+ hydrogenated amorphous silicon to which silicide or an n-type impurity is doped at a high concentration.

A data conductor including, for example, a plurality of data lines 171a and 171b, a plurality of first drain electrodes 175a, a plurality of second drain electrodes 175b, and a plurality of third drain electrodes 175c is formed on the ohmic contacts.

The data lines 171a and 171b transfer a data signal therethrough, and mainly extend, for example, in a vertical direction to cross the first gate line 121a and the second gate line 121b. The data lines 171a and 171b include, for example, a first source electrode 173a and a second source electrode 173b extending toward the first gate electrode 124a and the second gate electrode 124b and connected to each other. The first source electrode 173a and the second source electrode 173b respectively face the first drain electrode 175a and the second drain electrode 175b with the first gate electrode 124a and the second gate electrode 124b interposed therebetween.

The first drain electrode 175a, the second drain electrode 175b, and the third drain electrode 175c include one rod-shaped end portion and the other end portion having a relatively wide area. For example, the rod-shaped end portions of the first drain electrode 175a and the second drain electrode 175b are partially surrounded by the first source electrode 173a and the second source electrode 173b. One wide end portion of the first drain electrode 175a extends again to form a third source electrode 173c that is, for example, bent in a "U" form, and the third source electrode 173c faces a third drain electrode 175c. The wide end portion 177c of the third drain electrode 175c, for example, overlaps the capacitiance electrode 137 to form a voltage drop capacitor Cstd and the rod-shaped end portion is partially surrounded by the third source electrode 173c.

The first gate electrode 124a, the first source electrode 173a, and the first drain electrode 175a form a first thin film transistor Qa together with the first semiconductor 154a, the second gate electrode 124b, the second source electrode 173b, and the second drain electrode 175b form a second thin film transistor Qb together with the second semiconductor 154b, and the third gate electrode 124c, the third source electrode 173c, and the third drain electrode 175c form a third thin film transistor Qc together with the third semiconductor 154c.

The semiconductor stripe including the first semiconductor 154a, the second semiconductor 154b, and the third semiconductor 154c may have, for example, a flat shape that is substantially the same as those of data conductors 171a, 171b, 173a, 173b, 173c, 175a, 175b, and 175c and the ohmic contact therebeneath with the exception of a channel region between the source electrodes 173a, 173b, and 173c and the drain electrodes 175a, 175b, and 175c.

An exposed portion that is not covered by the first source electrode 173a and the first drain electrode 175a is present between the first source electrode 173a and the first drain electrode 175a in the first semiconductor 154a, an exposed portion that is not covered by the second source electrode 173b and the second drain electrode 175b is present between the second source electrode 173b and the second drain electrode 175b in the second semiconductor 154b, and an exposed portion that is not covered by the third source electrode 173c and the third drain electrode 175c is present between the third source electrode 173c and the third drain electrode 175c in the third semiconductor 154c.

A passivation layer 180 that may be made of, for example, an inorganic insulator such as silicon nitride or silicon oxide is formed on the data conductors 171a, 171b, 173a, 173b, 173c, 175a, 175b, and 175c and the exposed portions of the first, the second, and the third semiconductors 154a, 154b, and 154c.

However, alternatively, the passivation layer 180 may be made of, for example, an organic insulator such as, for example, benzocyclobutene (BCB) or acrylic resin., and may have a flat surface. The passivation layer 180 may have, for example, a dual-layer structure of a lower inorganic layer and an upper organic layer so that beneficial insulating characteristics of the organic layer are ensured and there is no damage to the exposed portions of the semiconductors 154a, 154b, and 154c.

A plurality of contact holes 185a and 185b through which the first drain electrode 175a and the second drain electrode 175b are exposed are formed on the passivation layer 180.

A pixel electrode 191 including, for example, a first subpixel electrode 191a and a second subpixel electrode 191b and a blocking electrode 9 are formed on the passivation layer 180. The pixel electrode 191 may be made of, for example, a transparent conductive material such as indium tin oxide (ITO), indium-tin-zinc-oxide (ITZO), aluminium zinc oxide (AZO), zinc oxide (ZnO) or indium zinc oxide (IZO), or reflective metal such as, for example, aluminum, silver, chromium or an alloy thereof.

For example, a horizontal central cutout 91, a vertical central cutout 92c1, lower cutouts 92a1, 92a2, and 92c2 and upper cutouts 92b1, 92b2, and 92c3 are formed in the pixel electrode 191, and the pixel electrode 191 is divided into a plurality of regions by these cutouts 91, 92c1, 92a1, 92a2, 92c2, 92b1, 92b2, and 92c3. The cutouts 91, 92a1, 92a2, 92c2, 92b1, 92b2, and 92c3 are, for example, almost inversely symmetric to a virtual horizontal central line dividing the pixel electrode 191 in half.

For example, the pixel electrode 191 includes lower cutouts 92a1, 92a2 and upper cutouts 92b1 and 92b2 which are diagonal line portions each positioned on a lower half and an upper half with respect to the horizontal central line of the pixel electrode 191, and vertical central cutout 92c1, and lower cutout 92c2 and upper cutout 92c3 which are connection portions connecting the lower diagonal line cutouts 92a1, 92a2, and the upper diagonal line cutouts 92b1, and 92b2 to each other. The lower diagonal line cutouts 92a1, 92a2, and the upper diagonal line cutouts 92b1, and 92b2 may extend, for example, to be approximately inclined from a right side of the pixel electrode 191 to a left side thereof, and may extend to be vertical to each other while forming an angle of about 45° to the gate line 121.

The lower half of the pixel electrode 191 is divided, for example, into two regions by the lower diagonal line cutouts 92a1 and 92a2, and the upper half thereof is divided into two regions by the upper diagonal line cutouts 92b1 and 92b2. For example, the lower diagonal line cutouts 92a1 and 92a2, the upper diagonal line cutouts 92b1 and 92b2, and the connection portions 92c1, 92c2, and 92c3 may form a closed circuit, and the pixel electrode 191 may be divided into the first subpixel electrode 191a and the second subpixel electrode 191b by the lower diagonal line cutouts 92a1 and 92a2, the upper diagonal line cutouts 92b1 and 92b2, and the connection portions 92c1, 92c2, and 92c3.

In this case, the number of pixel electrode regions or the number of cutouts may be changed according to design factors such as the size of the pixel electrode 191, a length ratio of a horizontal side and a vertical side of the pixel electrode 191, and a kind or a characteristic of the liquid crystal layer 3. The first subpixel electrode 191a and the second subpixel electrode 191b are connected to the first drain electrode 175a and the second drain electrode 175b through contact holes 185a and 185b, respectively, and receive the data voltage from the first drain electrode 175a and the second drain electrode 175b.

The first subpixel electrode 191a and the second subpixel electrode 191b to which the data voltage is applied generate an electric field together with the common electrode 270 of the upper display panel 200 to determine a direction of the liquid crystal molecules 310 of the liquid crystal layer 3 between two electrodes. The liquid crystal molecules of the liquid crystal layer aligned so as to be vertical to the surfaces of the two electrodes in a state where there is no electric field lie in a direction that is horizontal to the surfaces of the two electrodes, and luminance of light passing through the liquid crystal layer is changed according to the degree of lying of the liquid crystal molecules.

The first subpixel electrode 191a and the common electrode 270 form a first liquid crystal capacitor Clca together with the liquid crystal layer 3 therebetween, and the second subpixel electrode 191b and the common electrode 270 form a second liquid crystal capacitor Clcb together with the liquid crystal layer 3 therebetween to maintain the applied voltage even after the first and the second thin film transistors Qa and Qb are turned off.

The first subpixel electrode 191a and the second subpixel electrode 191b each overlap the storage electrode line 131 to form the first storage capacitor Csta and the second storage capacitor Cstb, and the first storage capacitor Csta and the second storage capacitor Cstb each strengthen a voltage storage ability of the first liquid crystal capacitor Clca and the second liquid crystal capacitor Clcb.

The capacitive electrode 137 and an extending portion 177c of the third drain electrode 175c overlap the gate insulating layer 140 with the semiconductor interposed therebetween to form a voltage drop capacitor Cstd. However, the semiconductor disposed between the capacitive electrode 137 and the extending portion 177c of the third drain electrode 175c may be removed.

Hereinafter, the upper display panel 200 will be described.

The light blocking member (not shown) is formed on the insulation substrate 210 made of, for example, transparent glass, quartz, plastic or the like. Further, in an exemplary embodiment, the glass may include, for example, tempered glass. In an exemplary embodiment, the insulation substrate 210 may be formed of, for example, one of polycarbonate (PC), polyester (PET), polypropylene (PP), polyethylene (PE) and polymethyl methacrylate (PMMA). The light blocking member is called a black matrix, and serves to prevent light leakage between the pixel electrodes 191. The light blocking member has, for example, a plurality of openings (not shown) facing the pixel electrode 191 and having almost the same shape as the pixel electrode 191. However, the light blocking member may be formed of, for example, a portion corresponding to the gate lines 121a and 121b and the data lines 171a and 171b and a portion corresponding to the thin film transistor.

A plurality of color filter 230 are formed on the substrate 210. The color filter 230 may be, for example, mainly present in the region surrounded by the light blocking member, and may longitudinally extend in a vertical direction along a column of the pixel electrode 191. Each color filter 230 may display, for example, any one of three primary colors of red, green and blue colors.

An overcoat 250 is formed on the color filter 230. The overcoat 250 may be, for example, made of an insulator, prevent exposure of the color filter 230 and provide a flat surface. Alternatively, the overcoat 250 may be omitted.

A common electrode 270 is formed on the overcoat 250. The common electrode 270 is made of, for example, a transparent conductor such as indium tin oxide (ITO), indium-tin-zinc-oxide (ITZO), aluminum zinc oxide (AZO), zinc oxide (ZnO), or indium zinc oxide (IZO), and an assembly of a plurality of cutouts 71, 71a1, 71a2, 71a3, 71b1, 71b2, and 71b3 are formed in the common electrode 270.

The assembly of a plurality of cutouts 71, 71a1, 71a2, 71a3, 71b1, 71b2, and 71b3 includes, for example, a central cutout 71, first to third lower diagonal line cutouts 71a1, 71a2, and 71a3 and first to third upper diagonal line cutouts 71b1, 71b2, and 71b3.

The cutouts 71, 71a1, 71a2, 71a3, 71b1, 71b2, and 71b3 are each disposed between the adjacent cutouts 92a1, 92a2, 92b1, and 92b2 of the pixel electrode 191 or between the cutouts 92a1, 92a2, 92b1, and 92b2 of the pixel electrode and sides of edges of the pixel electrode 191.

The assembly of a plurality of cutouts 71, 71a1, 71a2, 71a3, 71b1, 71b2, and 71b3 are, for example, almost inversely symmetric to a virtual horizontal central line of the pixel electrode 191.

The cutout of the pixel electrode 191 and the cutouts of the common electrode 270 divide the pixel electrode 191 into, for example, a plurality of subregions, and each subregion has two primary edges forming an oblique angle with the primary edge of the pixel electrode 191. As the liquid crystal molecules 310 on each subregion are mostly inclined in a direction that is, for example, vertical to the primary edge, inclination directions are approximately four directions.

As described above, a standard viewing angle of the liquid crystal display is increased by diversifying the inclination direction of the liquid crystal molecules 310. Alignment layers 11 and 21 are applied on internal surfaces of the lower display panel 100 and the upper display panel 200, and may be, for example, a vertical alignment layer. For example, the alignment layers 11 and 21 may be positioned on the pixel electrode 191 and the common electrode 270.

The polarizers (not shown) may be each provided on the outer surface of the display panels 100 and 200, transmissive axes of the polarizers may be, for example, orthogonal to each other. Also, for example, any one transmissive axis thereof be parallel to the gate line 121. In the case of the reflective liquid crystal display, any one of two polarizers may be omitted.

A liquid crystal layer 3 is interposed between the lower display panel 100 and the upper display panel 200. The liquid crystal layer 3 includes a plurality of liquid crystal molecules 310.

The liquid crystal 310 has, for example, negative dielectric anisotropy, and is aligned so that a long axis thereof is almost vertical to surfaces of the two display panels 100 and 200 in a state where there is no electric field.

In the present exemplary embodiment, the liquid crystal layer 3 includes the liquid crystal molecules 310 formed of for example, the aforementioned liquid crystal composition according to the present exemplary embodiment of the present invention. For example, in the present exemplary embodiment, the liquid crystal layer 3 includes the liquid crystal molecules 310 including a first compound represented by the following Chemical Formula 1 and a second compound represented by the following Chemical Formula 2.

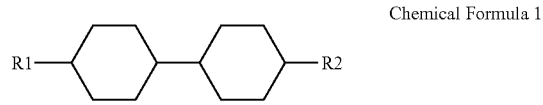

Chemical Formula 1

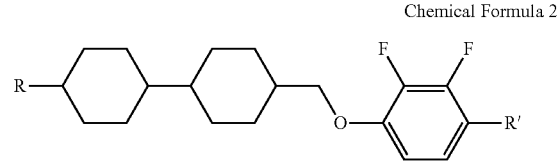

Chemical Formula 2

Herein, in Chemical Formula 1, R1 may be, for example, an alkenyl group having 2 to 5 carbon atoms and including a double bond, R2 may be, for example, an alkyl group or an alkoxy group, and the number of carbon atoms of the alkyl group or the alkoxy group may be, for example, 1 to 10. In addition, in Chemical Formula 2, R and R' are, for example, each independently an alkyl group or an alkoxy group. The number of carbon atoms of the alkyl group or the alkoxy group may be, for example, 1 to 10.

The first compound may be a compound represented by, for example, the following Chemical Formula 1.1.

Chemical Formula 1.1

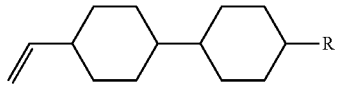

The description of the liquid crystal composition according to the present exemplary embodiment of the present invention may be applied to the liquid crystal composition included in the liquid crystal layer 3 of the liquid crystal display according to the present exemplary embodiment.

Figure 9:
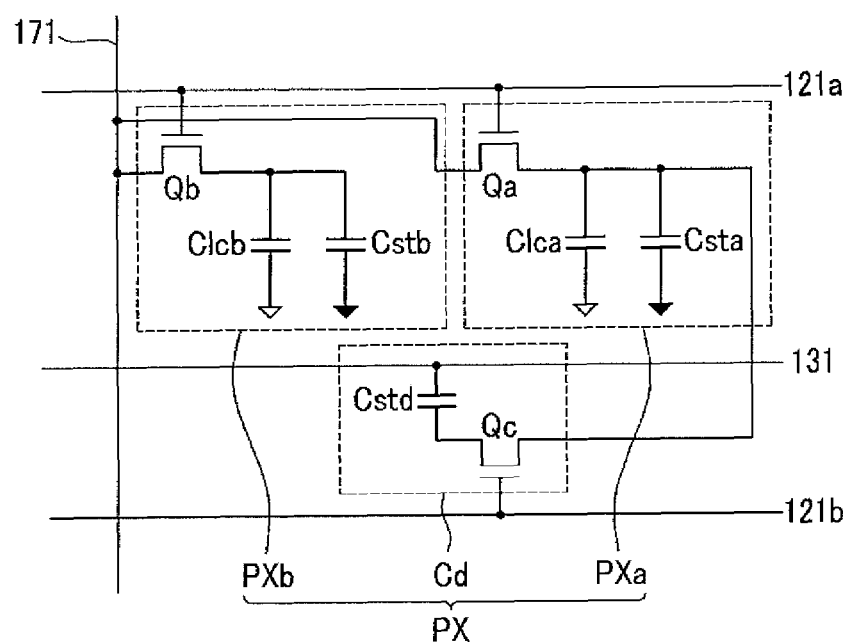
FIG. 9 is an equivalent circuit diagram for one pixel of the liquid crystal display shown in FIG. 7.

FIG. 9 is an equivalent circuit diagram for one pixel of the liquid crystal display shown in FIG. 7. Referring to FIG. 9, a structure and an operation of a circuit view of the liquid crystal display shown in FIG. 7 will be described.

The liquid crystal display according to the present exemplary embodiment of the present invention includes signal lines including, for example, the first gate line 121a, the second gate line 121b, the storage electrode line 131, and the data line 171, and the pixel PX connected thereto.

The pixel PX includes, for example, a first subpixel PXa, a second subpixel PXb, and a voltage drop portion Cd.

The first subpixel PXa includes, for example, a first switching element Qa, a first liquid crystal capacitor Clca, and a first storage capacitor Csta, the second subpixel PXb includes a second switching element Qb, a second liquid crystal capacitor Clcb, and a second storage capacitor Cstb, and the voltage drop portion Cd includes a third switching element Qc and a voltage drop capacitor Cstd.

The first and the second switching elements Qa and Qb are, for example, a three terminal element such as a thin film transistor provided in a lower display panel, a control terminal thereof is connected to the first gate line 121a, an input terminal thereof is connected to the data line 171, and output terminals thereof are each connected to the first and the second liquid crystal capacitors Clca and Clcb and the first and the second storage capacitors Csta and Cstb.

The third switching element Qc is, for example, the three terminal element such as the thin film transistor provided in the lower display panel, the control terminal thereof is connected to the second gate line 121b, the input terminal thereof is connected to the first liquid crystal capacitor Clca, and the output terminal thereof is connected to the voltage drop capacitor (Cstd).

The first and the second liquid crystal capacitors Clca and Clcb are formed by, for example, overlapping the first and the second subpixel electrodes 191a and 191b, which are connected to the first and the second switching elements Qa and Qb, respectively, and the common electrode of the upper display panel. The first and the second storage capacitors Csta and Cstb are formed by, for example, overlapping the storage electrode line 131 and the first and the second subpixel electrodes 191a and 191b.

The voltage drop capacitor Cstd is connected to the output terminal of the third switching element Qc and the storage electrode line 131, and is formed by, for example, overlapping the storage electrode line 131 and the output terminal of the third switching element Qc provided in the lower display panel with an insulator interposed therebetween.

Operation of the liquid crystal display shown in FIG. 7 will be described.

First, if a gate-on voltage Von is applied to the first gate line 121a, the first and the second thin film transistors Qa and Qb connected thereto are turned on.

Accordingly, the data voltage of the data line 171b is identically applied to the first and the second subpixel electrodes 191a and 191b through the first and the second switching elements Qa and Qb that are turned on. As the first and the second liquid crystal capacitors Clca and Clcb are charged by a difference between the common voltage Vcom of the common electrode 270 and the voltage of the first and the second subpixel electrodes 191a and 191b, the charge voltage of the first liquid crystal capacitor Clca and the charge voltage of the second liquid crystal capacitor Clcb are the same as each other. In this case, the gate-off voltage Voff is applied to the second gate line 121b.

Next, if the gate-on voltage Von is applied to the second gate line 121b while the gate-off voltage Voff is applied to the first gate line 121a, the first and the second switching elements Qa and Qb connected to the first gate line 121a are turned off, and the third switching element Qc is turned on. Accordingly, an electric charge of the first subpixel electrode 191a connected to the output terminal of the first switching element Qa flows into the voltage drop capacitor Cstd to reduce the voltage of the first liquid crystal capacitor Clca.

The liquid crystal display according to the present exemplary embodiment is driven by frame inversion, and in the case where a data voltage having a positive (+) polarity based on the common voltage Vcom is applied to the data line 171 in the present frame as an example, negative (−) electric charges gather in the voltage drop capacitor Cstd after the prior frame is finished. If the third switching element Qc is turned on in the present frame, positive (+) electric charges of the first subpixel electrode 191a flow through the third switching element Qc into the voltage drop capacitor Cstd, thus, positive (+) electric charges gather in the voltage drop capacitor Cstd, and the voltage of the first liquid crystal capacitor Clca is reduced. In the next frame, on the contrary, the third switching element Qc is turned on in a state where negative (−) electric charges are charged in the first subpixel electrode 191a, thus, negative (−) electric charges of the first subpixel electrode 191a flow into the voltage drop capacitor Cstd, such that negative (−) electric charges gather in the voltage drop capacitor Cstd and the voltage of the first liquid crystal capacitor Clca is reduced.

As described above, according to the present exemplary embodiment, the charge voltage of the first liquid crystal capacitor Clca may be set to be always lower than the charge voltage of the second liquid crystal capacitor Clcb regardless of polarity of the data voltage. Accordingly, the charge voltages of the first and the second liquid crystal capacitors Clca and Clcb may be set to be different from each other to increase lateral surface visibility of the liquid crystal display.

Unlike the present exemplary embodiment, the first and the second switching elements Qa and Qb of the first and the second subpixel electrodes 191a and 191b may each receive different data voltages obtained from one image information through different data lines, or may be each connected to different gate lines to receive different data voltages obtained from one image information at different times. Alternatively, only the first subpixel electrode 191a may receive the data voltage through the switching element, and the second subpixel electrode 191b may receive a relatively low voltage through capacitive bonding with the first subpixel electrode 191a. In the case of various exemplary embodiments as described above, the third switching element Qc, the voltage drop capacitor Cstd and the like may be omitted.

Figure 10:
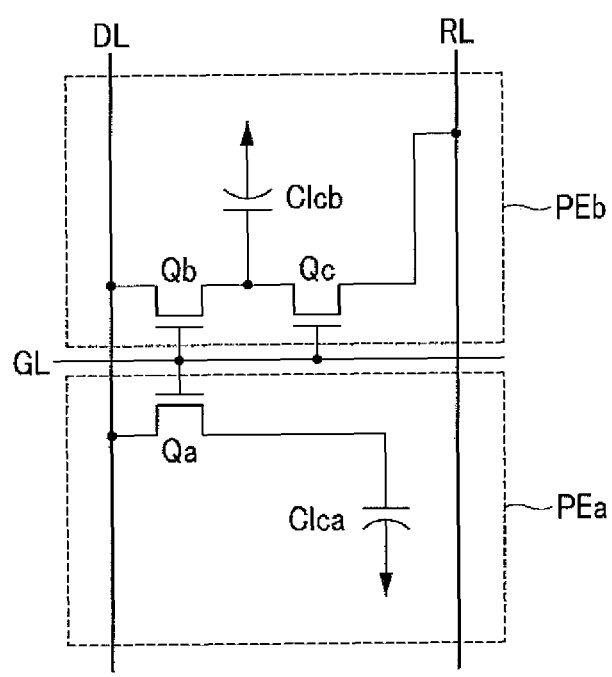
FIG. 10 is an equivalent circuit diagram for the pixel of the liquid crystal display according to an exemplary embodiment of the present invention.

FIG. 10 is an equivalent circuit diagram for the pixel of the liquid crystal display according to an exemplary embodiment of the present invention.

Referring to FIG. 10, one pixel PX of the liquid crystal display according to the present exemplary embodiment of the present invention includes a plurality of signal lines including, for example, a gate line GL through which a gate signal is transferred, a data line DL through which a data signal is transferred, and a reference voltage line RL through which a partial voltage reference voltage is transferred, the first switching element Qa, the second switching element Qb and the third switching element Qc connected to a plurality of signal lines, the first liquid crystal capacitor Clca, and the second liquid crystal capacitor Clcb.

The first switching element Qa and the second switching element Qb are connected to the gate line GL and the data line DL, respectively, and the third switching element Qc is connected to the output terminal of the second switching element Qb and the reference voltage line RL.

The first switching element Qa and the second switching element Qb are, for example, the three terminal element such as the thin film transistor, the control terminal thereof is connected to the gate line GL, the input terminal thereof is connected to the data line DL, the output terminal of the first switching element Qa is connected to the first liquid crystal capacitor Clca, and the output terminal of the second switching element Qb is connected to the second liquid crystal capacitor Clcb and the output terminal of the third switching element Qc.

The third switching element Qc is, for example, the three terminal element such as the thin film transistor, the control terminal thereof is connected to the gate line GL, the output terminal thereof is connected to the second liquid crystal capacitor Clcb, and the input terminal thereof is connected to the reference voltage line RL.

If a gate on Von signal is applied to the gate line GL, the first switching element Qa, the second switching element Qb and the third switching element Qc connected thereto are turned on. Accordingly, the data voltage applied to the data line DL is applied to the first subpixel electrode PEa and the second subpixel electrode PEb through the first switching element Qa and the second switching element Qb that are turned on. In this case, the data voltages applied to the first subpixel electrode PEa and the second subpixel electrode PEb may be charged by, for example, the same value. However, according to the present exemplary embodiment of the present invention, the voltage applied to the second subpixel electrode PEb becomes a partial voltage through the third switching element Qc connected to the second switching element Qb in series. Accordingly, the voltage Vb applied to the second subpixel electrode PEb becomes smaller than the voltage Va applied to the first subpixel electrode PEa.

Accordingly, the voltage charged in the first liquid crystal capacitor Clca and the voltage charged in the second liquid crystal capacitor Clcb become different from each other. As the voltage charged in the first liquid crystal capacitor Clca and the voltage charged in the second liquid crystal capacitor Clcb are different from each other, inclination angles of liquid crystal molecules in the first subpixel and the second subpixel become different from each other, accordingly, luminances of two subpixels become different from each other. Accordingly, if the voltage charged in the first liquid crystal capacitor Clca and the voltage charged in the second liquid crystal capacitor Clcb are appropriately controlled, an image viewed in a lateral surface may become close to an image viewed in a front surface as closely as possible, such that lateral surface visibility may be increased.

The present exemplary embodiment of FIG. 10 is obtained by modifying a visible structure in the aforementioned liquid crystal display of FIGS. 5 to 7, and the description of the liquid crystal composition included in the liquid crystal layer may be applied to the present exemplary embodiment.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A liquid crystal composition comprising:
a first compound represented by the following Chemical Formula 1,
a second compound represented by the following Chemical Formula 2,
at least one of a third compound represented by the following Chemical Formula 3 and a fourth compound represented by the following Chemical Formula 4,
a fifth compound represented by the following Chemical Formula 5,
a sixth compound represented by the following Chemical Formula 6, and
a seventh compound represented by the following Chemical Formula 7:

Chemical Formula 1
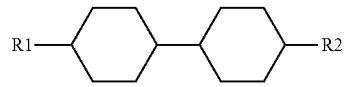

Chemical Formula 2
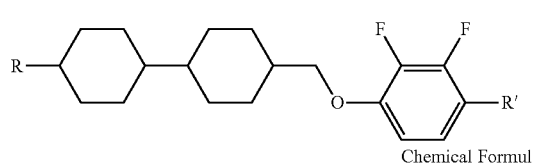

Chemical Formula 3
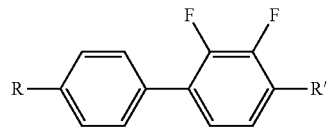

Chemical Formula 4
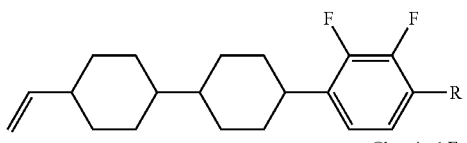

Chemical Formula 5

Chemical Formula 6
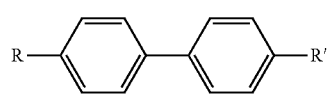

-continued

Chemical Formula 7

wherein in Chemical Formula 1, R1 is an alkenyl group including a double bond and R2 is an alkyl group or an alkoxy group, and in Chemical Formula 2, R and R' are each independently an alkyl group or an alkoxy group, wherein in Chemical Formulas 3 and 4, R and R' are each independently an alkyl group or an alkoxy group, wherein in Chemical Formulas 5 to 7, R and R' are each independently an alkyl group or an alkoxy group, wherein the liquid crystal composition includes the first compound, the second compound, the third compound, the fifth compound, the sixth compound, and the seventh compound, wherein a content of the first compound is about 19 wt % to about 39 wt %, wherein a content of the second compound is about 24 wt % to 44 wt %, wherein a content of the third compound is about 6 wt % to about 20 wt %, wherein a content of the fifth compound is about 3 wt % to about 13 wt %, wherein a content of the sixth compound is about 5 wt % to about 15 wt %, and wherein a content of the seventh compound is about 1 wt % to about 11 wt %.

2. A liquid crystal composition comprising:
a first compound represented by the following Chemical Formula 1,
a second compound represented by the following Chemical Formula 2,
at least one of a third compound represented by the following Chemical Formula 3 and a fourth compound represented by the following Chemical Formula 4,
a sixth compound represented by the following Chemical Formula 6,
an eighth compound represented by the following Chemical Formula 8:

Chemical Formula 1

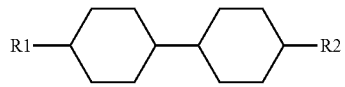

Chemical Formula 2

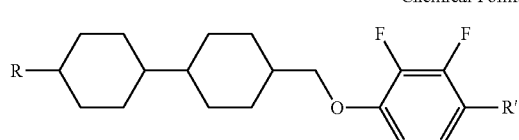

Chemical Formula 3

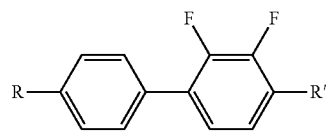

Chemical Formula 4

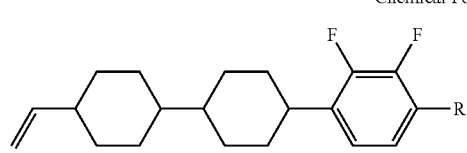

Chemical Formula 6

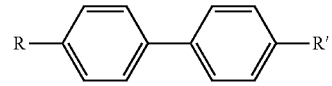

Chemical Formula 8

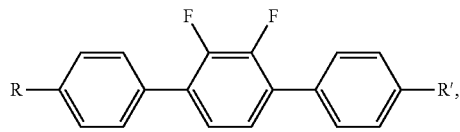

wherein in Chemical Formula 1, R1 is an alkenyl group including a double bond and R2 is an alkyl group or an alkoxy group, and in Chemical Formula 2, R and R' are each independently an alkyl group or an alkoxy group, wherein in Chemical Formulas 3 and 4, R and R' are each independently an alkyl group or an alkoxy group, wherein in Chemical Formulas 6 and 8, R and R' are each independently an alkyl group or an alkoxy group, wherein the liquid crystal composition includes the first compound, the second compound, the third compound and/or the fourth compound, the sixth compound, and the eighth compound, wherein a content of the first compound is about 19 wt % to about 59 wt %, wherein a content of the second compound is about 10 wt % to about 30 wt %, wherein a content of the third compound is about 4 wt % to about 18 wt %, wherein a content of the fourth compound is about 6 wt % to about 20 wt %, wherein a content of the sixth compound is about 3.5 wt % to about 13.5 wt %, and wherein a content of the eighth compound is about 3.5 wt % to about 13.5 wt %.

3. The liquid crystal composition of claim 1, wherein the liquid crystal composition has a refractive anisotropy of about 0.080 to about 0.130.

4. The liquid crystal composition of claim 1, wherein the liquid crystal composition has a dielectric anisotropy of about −4.0 to about −2.5.

5. A liquid crystal display comprising:
a first substrate,
a second substrate facing the first substrate,
a field generating electrode disposed on at least one of the first substrate and the second substrate, and
a liquid crystal layer including a liquid crystal molecule disposed between the first substrate and the second substrate,
wherein the liquid crystal molecule includes:
a first compound represented by the following Chemical Formula 1,
a second compound represented by the following Chemical Formula 2,
at least one of a third compound represented by the following Chemical Formula 3 and a fourth compound represented by the following Chemical Formula 4,
a fifth compound represented by the following Chemical Formula 5,
a sixth compound represented by the following Chemical Formula 6, and a seventh compound represented by the following Chemical Formula 7:

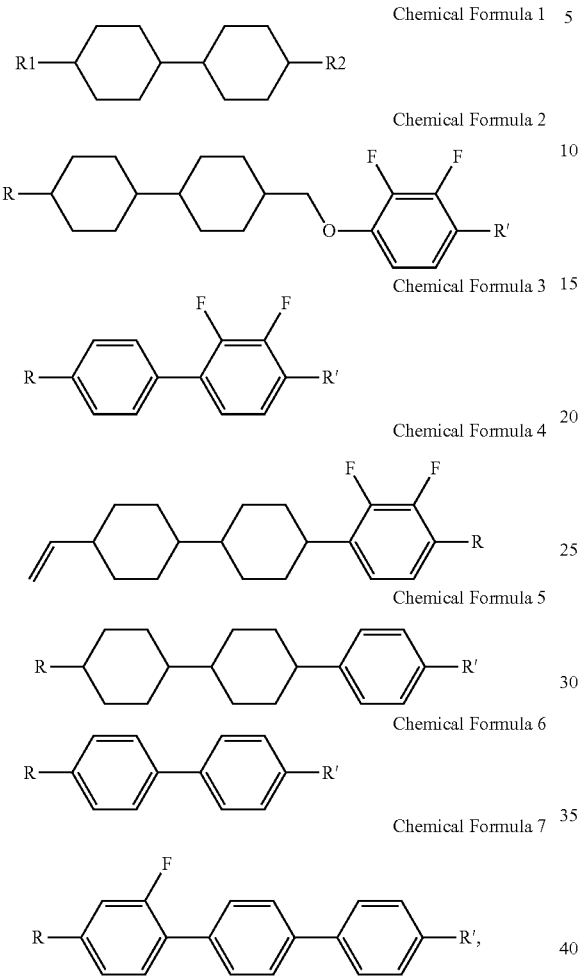

wherein in Chemical Formula 1, R1 is an alkenyl group including a double bond and R2 is an alkyl group or an alkoxy group, and in Chemical Formula 2, R and R' are each independently an alkyl group or an alkoxy group, wherein in Chemical Formulas 3 and 4, R and R' are each independently an alkyl group or an alkoxy group, wherein in Chemical Formulas 5 and 7, R and R' are each independently an alkyl group or an alkoxy group, wherein the liquid crystal composition includes the first compound, the second compound, the third compound, the fifth compound, the sixth compound, and the seventh compound, wherein a content of the first compound is about 19 wt % to about 39 wt %, wherein a content of the second compound is about 24 wt % to about 44 wt %, wherein a content of the third compound is about 6 wt % to about 20 wt %, wherein a content of the fifth compound is about 3 wt % to about 13 wt %, wherein a content of the sixth compound is about 5 wt % to about 15 wt %, and wherein a content of the seventh compound is about 1 wt % to about 11 wt %.

6. A liquid crystal display comprising:
a first substrate,
a second substrate facing the first substrate,
a field generating electrode disposed on at least one of the first substrate and the second substrate, and
a liquid crystal layer including a liquid crystal molecule disposed between the first substrate and the second substrate,
wherein the liquid crystal molecule includes:
a first compound represented by the following Chemical Formula 1,
a second compound represented by the following Chemical Formula 2,
at least one of a third compound represented by the following Chemical Formula 3 and a fourth compound represented by the following Chemical Formula 4,
a sixth compound represented by the following Chemical Formula 6, and
an eighth compound represented by the following Chemical Formula 8:

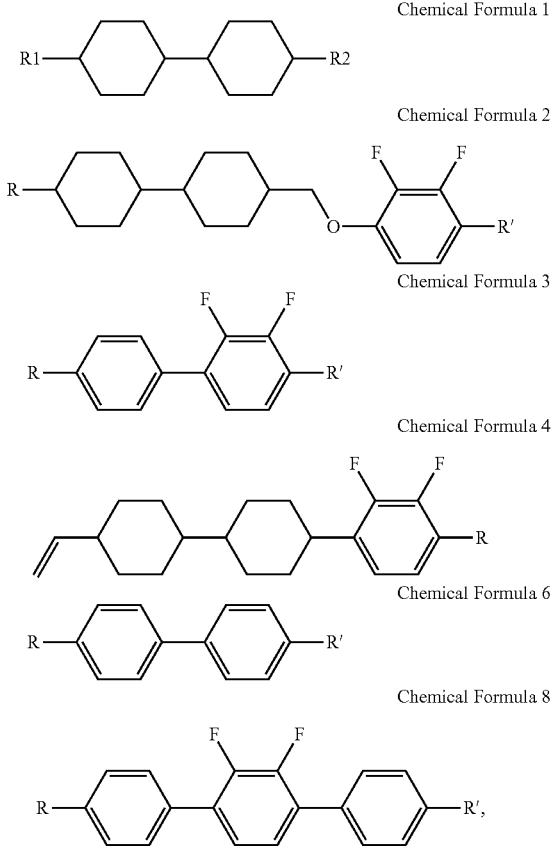

wherein in Chemical Formula 1, R1 is an alkenyl group including a double bond and R2 is an alkyl group or an alkoxy group, and in Chemical Formula 2, R and R' are each independently an alkyl group or an alkoxy group, wherein in Chemical Formulas 3 and 4, R and R' are each independently an alkyl group or an alkoxy group, wherein in Chemical Formulas 6 and 8, R and R' are each independently an alkyl group or an alkoxy group, wherein the liquid crystal composition includes the first compound, the second compound, the third compound and/or the fourth compound, the sixth compound, and the eighth compound, wherein a content of the first compound is about 19 wt % to about 59 wt %, wherein a content of the second compound is about 10 wt % to about 30 wt %, wherein a content of the third compound is about 4 wt % to about 18 wt %, wherein a content of the fourth compound is about 6 wt % to about 20 wt %, wherein a content of the sixth compound is about 3.5 wt % to about 13.5 wt %, and wherein a content of the eighth compound is about 3.5 wt % to about 13.5 wt %.

7. The liquid crystal display of claim 5, wherein the liquid crystal composition including the liquid crystal molecule has a refractive anisotropy of about 0.080 to about 0.130.

8. The liquid crystal display of claim 5, wherein the liquid crystal composition including the liquid crystal molecule has a dielectric anisotropy of about −4.0 to about −2.5.

9. The liquid crystal display of claim 5, further comprising:
an alignment layer disposed on the field generating electrode,
wherein the alignment layer includes an alignment agent and an alignment polymer, and the alignment polymer is formed by radiating light on the alignment agent and an alignment aid.

10. The liquid crystal display of claim 5, further comprising:
at least one of a color filter and a black matrix disposed on the thin film transistor substrate,
and wherein the first substrate is a thin film transistor substrate, and the second substrate is a common electrode substrate.

11. The liquid crystal display of claim 5, wherein the field generating electrode includes a pixel electrode disposed on the first substrate and a common electrode disposed on the second substrate,
and wherein the pixel electrode includes a first cutout, the common electrode includes a second cutout, and the first cutout and the second cutout are alternately arranged.

12. The liquid crystal display of claim 5, wherein the liquid crystal molecule is vertically aligned in a state where an electric field is not applied.

* * * * *